United States Patent [19]

Takaki et al.

[11] Patent Number: 5,334,660

[45] Date of Patent: Aug. 2, 1994

[54] VINYL CHLORIDE RESIN COMPOSITION

[75] Inventors: Akira Takaki, Kobe; Hiroto Mori, Takasago; Toshihiko Hasegawa, Hyogo, all of Japan

[73] Assignee: Kanegafuchi Kagaku Kogyo Kabushiki Kaisha, Osaka, Japan

[21] Appl. No.: 867,479

[22] Filed: Apr. 13, 1992

[51] Int. Cl.$^5$ .............. C08L 25/10; C08L 25/14; C08L 51/04; C08L 55/04

[52] U.S. Cl. ................. 525/84; 525/86; 525/241; 525/227

[58] Field of Search ............ 525/84, 902, 86, 241, 525/227

[56] References Cited

U.S. PATENT DOCUMENTS

| | | | |
|---|---|---|---|
| 4,508,876 | 4/1985 | Takaki et al. | 525/902 |
| 4,624,987 | 11/1986 | Hosoi et al. | 525/84 |
| 4,857,592 | 8/1989 | Hoshino et al. | 525/84 |

FOREIGN PATENT DOCUMENTS

| | | |
|---|---|---|
| 0163939 | 12/1985 | European Pat. Off. |
| 1934850 | 1/1970 | Fed. Rep. of Germany |
| 2624656 | 12/1977 | Fed. Rep. of Germany |

*Primary Examiner*—James J. Seidleck
*Assistant Examiner*—W. R. H. Clark
*Attorney, Agent, or Firm*—Varndell Legal Group

[57] ABSTRACT

A vinyl chloride resin composition having an improved impact resistance with a good transparency that the vinyl chloride resin itself possesses originally; which comprises (A) a graft copolymer prepared by (i) adding a water-soluble electrolyte to a butadiene polymer (a) (ii) adding a monomer mixture (b) containing mainly an aromatic vinyl monomer to polymerize, (iii) adding a monomer mixture (c) containing mainly an alkyl methacrylate to polymerize and (iv), when desired, adding a monomer mixture (d) containing mainly an aromatic vinyl monomer.

4 Claims, No Drawings

VINYL CHLORIDE RESIN COMPOSITION

BACKGROUND OF THE INVENTION

The present invention relates to a vinyl chloride resin composition, and more particularly to a vinyl chloride resin composition having an improved impact resistance with an excellent transparency that the vinyl chloride resin itself possesses originally.

A so-called MBS resin wherein methyl methacrylate, styrene and the like are graft-polymerized onto a butadiene rubber has been used as a reinforcing agent for improving the impact resistance of vinyl chloride resins. It is important that the transparency of the resins is not impaired by the incorporation of the reinforcing agent. Various improvements of the reinforcing agent for vinyl chloride or of the process for improving the impact resistance of vinyl chloride resins without impairing the transparency of the resins are also proposed. However, demand for improvement of the quality of vinyl chloride resin products is still strong and a further improvement is desired.

For instance, it has been well known that the impact strength of the MBS resin is improved by agglomerating the particles to form large particles. Accordingly, various agglomerating techniques of the MBS resin particles have been developed, as discussed in, for instance, Japanese Examined Patent Publication No. 42-22541, and No. 46-3 1462, and the like. However, it is general that when the MBS resin having a large particle size is admixed with the vinyl chloride resin, the obtained vinyl chloride resin composition is lowered in transparency. As mentioned above, it is very difficult to obtain both a high impact resistance and a good transparency, the two properties being very important properties of the vinyl chloride resin composition.

An object of the present invention is, while adopting the method wherein the particle size of the MBS resin is increased as a means for markedly increasing the impact resistance imparting ability of the reinforcing agent (MBS resin) for the vinyl chloride resin, to solve the great defect of the method that the transparency is lowered.

A further object of the present invention is to provide a vinyl chloride resin composition having both a high impact resistance and an excellent transparency.

These and other objects of the present invention will become apparent from the description hereinafter.

SUMMARY OF THE INVENTION

In accordance with the present invention, there is provided a vinyl chloride resin composition which comprises:

(A) 1 to 30% by weight of a graft copolymer and
(B) 99 to 70% by weight of a vinyl chloride resin; the graft copolymer (A) being prepared by
(i) adding a water-soluble electrolyte to an aqueous latex containing 50 to 85 parts by weight of a butadiene polymer (a) of 60 to 100% by weight of butadiene, 40 to 0% by weight of an aromatic vinyl monomer, 10 to 0% by weight of a vinyl monomer copolymerizable therewith and 5 to 0% by weight of a crosslinking monomer, the butadiene polymer (a) having an average particle size of less than 0.1 μm,
(ii) adding 1 to 45 parts by weight of a monomer mixture (b) to the latex and carrying out the polymerization, the monomer mixture (b) comprising 51 to 100% by weight of an aromatic vinyl monomer, 49 to 0% by weight of an alkyl methacrylate and 0 to 20% by weight of a vinyl monomer copolymerizable therewith,
(iii) adding 5 to 45 parts by weight of a monomer mixture (c) to the polymerization mixture in the step (ii) and carrying out the polymerization, the monomer mixture (c) comprising 51 to 100% by weight of an alkyl methacrylate, 49 to 0% by weight of an aromatic vinyl monomer and 0 to 20% by weight of a vinyl monomer copolymerizable therewith, and
(iv) adding 0 to 30 parts by weight of a monomer mixture (d) to the polymerization mixture in the step (iii) and carrying out the polymerization, the monomer mixture comprising 51 to 100% by weight of an aromatic vinyl monomer, 49 to 0% by weight of an alkyl methacrylate and 0 to 20% by weight of a vinyl monomer copolymerizable therewith; the total amount of (a), (b), (c) and (d) being 100 parts by weight.

DETAILED DESCRIPTION

The aqueous latex of the butadiene polymer (a) used in the present invention is an aqueous latex of the butadiene polymer (a) of 60 to 100% by weight of butadiene, 40 to 0% by weight of an aromatic vinyl monomer, 10 to 0% by weight of a vinyl monomer (i) copolymerizable therewith and 0 to 5% by weight of a crosslinking monomer. The butadiene polymer (a) has an average particle size of less than 0.1 μm. The aqueous latex is obtained in, for example, an emulsion polymerization manner.

The aromatic vinyl monomer is used when it is required to raise the refractive index of the produced butadiene polymer (a). Examples of the aromatic vinyl monomer are, for instance, styrene, and the like. Examples of the copolymerizable vinyl monomers (i) are, for instance, a vinyl cyanide monomer such as acrylonitrile, an alkyl acrylate having a $C_1$ to $C_5$ alkyl group such as ethyl acrylate or butyl acrylate, and the like. Examples of the crosslinking monomer are, for instance, divinyl benzene, and the like. The aromatic vinyl monomers, the copolymerizable vinyl monomers (i) and the crosslinking monomers are not limited to those as exemplified above. They are used alone or in admixture thereof, respectively.

Butadiene is used in such an amount as producing the butadiene polymer (a) containing 60 to 100% by weight, preferably 70 to 85% by weight, of butadiene. When the butadiene content is less than 60% by weight, the impact resistance of the obtained vinyl chloride resin composition is lowered.

Also, the aromatic vinyl monomer, the copolymerizable vinyl monomer (i) and the crosslinking monomer are used in such mounts as producing the butadiene polymer (a) containing 40 to 0% by weight of the aromatic vinyl monomer, 10 to 0% by weight of the copolymerizable vinyl monomer (i) and 0 to 5% by weight of the crosslinking monomer. From the viewpoint of effectively improving the properties of the butadiene polymer (a), it preferable that the polymer (a) contains from 30 to 15% by weight of the aromatic vinyl monomer, 5 to 0% by weight of the copolymerizable vinyl monomer (i) and 0 to 2% by weight of the crosslinking monomer. When the aromatic vinyl monomer content is more than 40% by weight, the butadiene content is too small. When the copolymerizable vinyl monomer (i) content is more than 10% by weight, the impact strength of the composition lowered. When the crosslinking monomer content is more than 5% by weight, the impact strength of the composition is lowered. When the crosslinking monomer content is more than 5% by weight, the impact strength of the composition is lowered.

The average particle of the butadiene polymer (a) is less than 0.1 μm preferably from 0.07 to 0.08 μm. When the average particle size is not less than 0.1 μm, it is difficult to agglomerate the MBS resin particles, and the obtained composition is poor a little in impact strength.

In the present invention, the water-soluble electrolyte is added to the aqueous latex containing 50 to 85 parts by weight of the butadiene polymer (a), the latex having a solid concentration of about 50 to 25% by weight. Subsequently, 1 to 45 parts by weight of the monomer mixture (b) comprising 51 to 100% by weight of the aromatic vinyl monomer, 49 to 0% by weight of the alkyl methacrylate and 0 to 20% by weight of the vinyl monomer (ii) copolymerizable therewith is added to the resulting aqueous latex and the polymerization is carried out (the first stage graft polymerization). Then, 5 to 45 parts by weight of the monomer mixture (c) comprising 51 to 100% by weight of the alkyl methacrylate, 49 to 0 % by weight of the aromatic vinyl monomer and 0 to 20% by weight of the vinyl monomer (iii) copolymerizable therewith is added to the reaction mixture in the first stage graft polymerization and the polymerization is carried out (the second stage graft polymerization). Then, 0 to 30 parts by weight of the monomer mixture (d) comprising 51 to 100% by weight of the aromatic vinyl monomer, 49 to 0% by weight of the alkyl methacrylate and 0 to 20% by weight of the vinyl monomer (ii) copolymerizable therewith to the reaction mixture in the second stage graft polymerization and the polymerization is carried out (the third stage graft polymerization) to give the graft copolymer (A). The total amount of the polymer (a), and the mixtures (b), (c) and (d) is 100 parts by weight. In the present invention, thus obtained graft copolymer (A) having an average particle size of 0.1 to 0.3 μm is used.

Since, in the present invention, there is used the graft copolymer (A) prepared, as mentioned above, by graft polymerizing the monomer mixture (b) containing mainly the aromatic vinyl monomer onto the butadiene polymer (a) to give a copolymer (1), then graft polymerizing the monomer mixture (c) containing mainly the alkyl methacrylate onto the copolymer (1) to give a copolymer (2), and further graft polymerizing the monomer mixture (d) containing mainly the aromatic vinyl monomer onto the copolymer (2), the transparency of the vinyl chloride resin (B) can be kept excellent as well as the high impact resistance can be given to the vinyl chloride resin (B).

The water-soluble electrolyte is used for agglomerating the rubber particles to form large particles during the graft polymerization. Examples of the electrolyte are, for instance, a compound capable of dissociating into $Na^+$, $K^+$, $Mg^{2+}$, $Ca^{2+}$, $Al^{3+}$, $NH_4^+$, or $H^+$, a compound capable of dissociating into $Cl^-$, $Br^-$, $SO_4^{2-}$, $SO_3^{2-}$, $S_2O_8^{2-}$, $NO_2^-$, $PO_4^{3-}$, $CO_3^{2-}$ or $OH^-$, and the like. Examples of the electrolyte are, for instance, $NaCl$, $KCl$, $Na_2SO_4$, $CaCl_2$, $Al\ Cl_3$, and the like.

The amount of the electrolyte is preferable from b 0.5 to 5 parts by weight, more preferably from 1.0 to 3 parts by weight, based on b 100 parts by weight of the total of (a), (b), (c) and (d). When the amount of the electrolyte is more than 5 parts by weight, the latex is unstable, and polymerization scales are apt to increase. On the other hand, when the amount is less than 0.5 part, it is difficult to cause the agglomeration.

The aromatic vinyl monomer contained in the monomer mixture (b) and the monomer mixture (d) (which is used in the first stage graft polymerization and the third stage graft polymerization) is used for the proposal of agreeing the refractive index of the graft copolymer (A) with that of the vinyl chloride resin (B) by raising the refractive index of the graft copolymer (A), thereby improving the transparency of the composition. Examples of the aromatic vinyl monomer are, for instance, styrene, α-methyl styrene, and the like.

The alkyl methacrylate contained in the monomer mixture (b) and the monomer mixture (d) is used when it is desired to improve the adhesion between the graft copolymer (A) and the vinyl chloride resin (B), thereby further improving the impact strength. Examples of the alkyl methacrylate are, for instance, an alkyl methacrylate having a $C_1$ to $C_5$ alkyl group such as methyl methacrylate, and the like. Examples of the copolymerizable monomer (ii) are, for instance, a vinyl cyanide monomer such as acrylonitrile, and an alkyl acrylate such as ethyl acrylate or butyl acrylate, and the like. The aromatic vinyl monomer, the alkyl methacrylate and the copolymerizable monomer (ii) used in the first stage graft polymerization and the third stage graft polymerization are not limited to the compounds as exemplified above, respectively. Also, they may be used alone or in admixture thereof. The kinds of the aromatic vinyl monomers used in the first stage graft polymerization and the third stage graft polymerization may be the same or different. Similarly, the kinds of the alkyl methacrylates and the copolymerizable vinyl monomers (ii) used in the first stage graft polymerization and the third stage graft polymerization may be the same or different, respectively.

Each of the monomer mixture (b) and the monomer mixture (d) contains from 51 to 100% by weight, preferably from 70 to 100% by weight, of the aromatic vinyl monomer. When the aromatic vinyl monomer content is less than 51% by weight, the transparency of the vinyl chloride resin composition is lowered. Also, each of the monomer mixture (b) and the monomer mixture (d) contains from 49 to 0% by weight of the alkyl methacrylate and 0 to 20% by weight of the copolymerizable vinyl monomer (ii). From the viewpoint of effectively improving the properties of the graft copolymer (A), it is preferable that the each mixture (b) or (d) contains from 30 to 0% by weight of the alkyl methacrylate and 0 to 10% by weight of the copolymerizable vinyl monomer (ii). When the alkyl methacrylate content is more than 49% by weight, the aromatic vinyl monomer content is too small. When the copolymerizable vinyl monomer (ii) content is more than 20% by weight, the transparency of the vinyl chloride resin composition is lowered.

The alkyl methacrylate contained in the monomer mixture (c), used in the second stage graft polymerization, is used for improving the impact strength of the composition. The aromatic vinyl monomer contained in the monomer mixture (c) is used when it is desired that the refractive index of the graft copolymer (A) is agreed with that of the vinyl chloride resin (B) by raising the refractive index of the copolymer (A), thereby further improving the transparency of the composition. The copolymerizable vinyl monomer (iii) contained in the monomer mixture (c) is used when it is required to improve the processability of the composition or to improve the occurrence of fish eyes during processing. The same compounds as exemplified in the monomer mixture (b) or the monomer mixture (d) can be used as the alkyl methacrylate, the aromatic vinyl monomer, and the copolymerizable vinyl monomer (iii) contained in the monomer mixture (c). These components are not limited thereto.

The monomer mixture (c) contains from 51 to 100% by weight, preferably from 70 to 100% by weight, alkyl methacrylate. When the alkyl methacrylate content is less than 51% by weight, the impact strength of the composition is lowered.

Also, the monomer mixture (c) contains from 49 to 0% by weight of the aromatic vinyl monomer and from 0 to 20% by weight of the copolymerizable vinyl monomer (iii). From the viewpoint of effectively improving the properties of the graft copolymer (A), it is preferable that the mixture (c) contains from 30 to 0% by weight of the aromatic vinyl monomer and from 0 to 10% by weight of the copolymerizable vinyl monomer (iii). When the aromatic vinyl monomer content is more than 49% by weight, the amount of the alkyl methacrylate is too small. When the copolymerizable vinyl monomer (iii) content is more than 20% by weight, the transparency and the impact resistance of the composition are lowered.

The mounts of the butadiene polymer (a), the monomer mixture (b), the monomer mixture (c) and the monomer mixture (d) are from 50 to 85 parts by weight, from 1 to 45 parts by weight, from 5 to 45 parts by weight and from 0 to 30 parts by weight, respectively, the total amount of (a), (b), (c) and (d) being 100 parts by weight. The sum of the monomer mixtures (b) and (d) is from 5 to 45 parts by weight. When the graft polymerization three stages conducted, it is preferable that the amounts of (a), (b), (c) and (d) are respectively from 50 to 85 parts by weight, from 1 to 20 parts by weight, from 5 to 45 parts by weight and from 4 to 30 parts by weight, and more preferably, from 60 to 80 parts by weight, from 2 to 10 parts by weight, from 10 to 20 parts by weight and from 5 to 15 parts by weight, the total amount of (a), (b), (c) and (d) being 100 parts by weight. Also, when the graft polymerization in two stages is conducted, it is preferable that the amounts of (a), (b) and (c) are respectively from 50 to 85 parts by weight, from 5 to 45 parts by weight and from 5 to 45 parts by weight, and more preferably from 60 to 80 parts by weight, from 10 to 20 parts by weight and from 10 to 20 parts by weight, the total amount of (a), (b) and (c) being 100 by weight. When the amount of the butadiene polymer (a) is less than 50 parts by weight, the impact strength of the composition is lowered. When the amount of the polymer (a) is more than 85 parts by weight, the graft copolymer (A) is apt to become a massive material during post treatment and no nomal resin is obtained. When the sum of the amount of the monomer mixtures (b) and (d) is less than 5 parts by weight, the transparency of the composition is lowered, and when the sum amount is more than 45 parts by weight, the impact strength is lowered. When the amount of the monomer mixture (c) is less than 5 parts by weight, the impact strength is lowered, and when the amount is more than 45 parts by weight, the transparency is lowered.

The first stage graft polymerization is not particularly limited in reaction conditions, and the like so long as prior to the first stage graft polymerization, the water-soluble electrolyte is added to the aqueous latex of the butadiene polymer (a). The second stage graft polymerization not particularly limited in reaction conditions, and the like. However, there is a case where the amount of scales generated during polymerization is increased. Such a defect can be solved by, on the second stage graft polymerization, previously preparing an emulsion of the monomer mixture (c) and continuously adding the obtained emulsion to the reaction mixture in the first stage polymerization. The emulsion is prepared by, for instance, adding the monomer mixture (c) to 5 to 90 parts by weight, preferably from 10 to 90 parts by weight, based on 100 parts by weight of the total of (a), (b), (c) and (d), of an aqueous solution containing 0.05 to 3 parts by weight, preferably from 0.1 to 1 part by weight, based on 100 parts by weight of the total of (a), (b), (c) and (d), of an emulsifier and stirring the mixture to emulsify. Examples of the emulsifier are, for instance, a soap such as sodium oleate potassium oleate or potassium palmitate, emulsifiers generally used, and the like. The emulsifier is not limited thereto.

When the amount of the emulsifier is less than 0.05 part by weight, the effect for decreasing the amount of the scales is lowered, and when the amount is more than 3 parts by weight, the obtained composition is lowered in heat stability. Also, when the amount of the aqueous solution containing the emulsifier is less than 5 parts by weight, it is impossible to smoothly emulsify the monomers in the monomer mixture (c), and when the amount is more than 90 parts by weight, the concentration of the graft copolymer (A) is lowered, so the productivity is lowered. As a means for emulsifying, a usual manner using a homogenizer or a line mixer can be adopted.

The average particle size of the graft copolymer (A) is from 0.1 to 0.3 μm preferable from 0.12 to 0.2 μm. When the average particle size is less than 0.1 μm, the effect for improving the impact resistance is lowered. When the average particle size is more than 0.3 μm, the transparency is remarkably lowered.

In order to improve the transparency of final molded art ides, it is preferable that the refractive index of the graft copolymer comes sufficiently close to that of the vinyl chloride resin. Typically, it is preferable that the difference in refractive index between the graft copolymer (A) and the vinyl chloride resin (B) is from about 0 to about 0.01.

From the thus obtained aqueous latex of the graft copolymer (A), a polymer powder is obtained by adding an acid and/or a salt to the latex to coagulate the polymer particles, thermally treating, washing the polymer particles with water, dehydrating and drying.

The obtained graft copolymer (A) is blended with the vinyl chloride resin (B) in an amount of 1 to 30% by weight, preferably from 3 to 30% by weight, more preferably from 5 to 15% by weight based on the total weight of the graft copolymer (A) and the vinyl chloride resin (B) in a usual manner to give the resin composition of the present invention. When the mount of the graft copolymer (A) is less than 1% by weight, the impact resistance of the composition is lowered. When the amount is more than 30% by weight, the rigidity is lowered.

The vinyl chloride resin (B) is not particularly limited. Any of those generally called vinyl chloride resins or polymers, polyvinyl chloride resins or the like, e.g.

vinyl chloride homopolymer, vinyl chloride copolymers having a vinyl chloride content of at least about 80% by weight, and post-chlorinated polyvinyl chloride can be used.

The composition of the present invention may contain usual additives used for vinyl chloride resins, such as a stabilizer or lubricant, and the like.

The resin composition of the present invention can be formed into molded articles, for example, by injection molding, calendering, blow molding, and the like. The molded articles have a high impact resistance and a good transparency and are suitably used for the purposes such as bottles and sheets.

The present invention more specifically described and explained by means of the following Examples, in which all parts and % are by weight unless otherwise noted. It is to be understood that the present invention is not limited to these Examples.

EXAMPLE 1

A polymerization vessel equipped with a stirrer was charged with 200 parts of water, 1.5 parts of sodium oleate, 0.002 part of ferrous sulfate ($FeSO_4 \cdot 7H_2O$), 0.005 part of disodium ethylenediaminetetraacetate, 0.2 part of formaldehyde sodium sulfoxylate, 0.2 part of tripotassium phosphate, 75 parts of butadiene, 25 parts of styrene, 1.0 part of divinyl benzene and 0.1 part of diisopropylbenzene hydroperoxide. The polymerization was carried out at 50° C. for 15 hours to give a rubber latex of which average particle size of polymer particles was 750 Å (hereinafter referred to as "rubber latex A"). The polymerization conversion was 99%.

To 210 parts of the rubber latex A (solid matter: 70 parts) were added 200 parts of water, 0.002 part of ferrous sulfate, 0.004 part of disodium ethylenediaminetetraacetate, 0.1 part of formaldehyde sodium sulfoxylate and 2.3 parts of potassium chloride. To the latex was then continuously added a mixture (b) of 14 parts of styrene, 1.0 part of methyl methacrylate and 0.2 part of cumene hydroperoxide at 70° C. over 3 hours, and the polymerization was further continued for 30 minutes (the first stage graft polymerization). Then, a mixture (c) of 14 parts of methyl methacrylate, 1.0 part of styrene and 0.1 part of cumene hydroperoxide was continuously added at 70° C. over 3 hours, and the polymerization was further continued for 1 hour (the second stage graft polymerization) to give an aqueous latex of a graft copolymer.

The particles of the graft copolymer latex were agglomerated, and had an average particle size of 1500 Å. A weight ratio of scales generated during graft polymerization to the graft copolymer was 2.2%.

Sulfuric acid was added to the obtained graft polymer latex to deposit the polymer, and the polymer powder through heat treating, rinsing, dehydrating and drying.

To 90 parts of polyvinyl chloride containing 1.5 parts of octyl tin mercaptide stabilizer, 0.5 part of glycerol ricinoleate and 0.2 part of a montanic acid ester was added 10 parts of the graft copolymer powder. The mixture was kneaded for 8 minutes by rolls of 170° C., and was pressed for 15 minutes by heat pressure rolls of 180° C. to give Izod impact test specimens having a thickness of 6 mm and transparent sheets having a thickness of 5 mm. The Izod impact strength was measured according to JIS K 7110, and the light transmission was measured according to JIS K 6714. The results are shown in Table 1.

EXAMPLE 2

The procedure of Example 1 was repeated except that the monomer mixture (c) used in the second stage graft polymerization, that is, 14 parts of methyl methacrylate, 1.0 part of styrene and 0.1 part of cumene hydroperoxide were emulsified in an aqueous solution of 0.3 part of sodium oleate and 15 parts of water by using a homogenizer, then the obtained emulsion was continuously added to the reaction mixture in the first stage graft polymerization over 3 hours.

The results are shown in Table 1.

EXAMPLE 3

The procedure of Example 1 was repeated except that the amount of potassium chloride was changed to 2.7 parts, so the obtained graft copolymer had an average particle size of 1800 Å.

The results are shown in Table 1.

EXAMPLE 4

The procedure of Example 1 was repeated except that before adding the monomer mixture (c), 15.3 parts of an aqueous solution containing 0.3 part of sodium oleate was added to the reaction mixture in the first stage graft polymerization.

The results are shown in Table 1.

COMPARATIVE EXAMPLE 1

The rubber latex A was prepared in the same manner as in Example 1.

To 210 parts of the rubber latex A (solid matter: 70 parts) were added 200 parts of water, 0.002 part of ferrous sulfate, 0.004 part of disodium ethylenediaminetetraacetate and 0.1 part of formaldehyde sodium sulfoxylate.

To the resulting mixture was continuously added a mixture of 14 parts of methyl methacrylate, 1.0 part of styrene and 0.1 part of cumene hydroperoxide at 70° C. over 3 hours, and the polymerization was continued for 30 minutes.

Then, a mixture of 14 parts of styrene, 1.0 part of methyl methacrylate and 0.2 part of cumene hydroperoxide was continuously added over 3 hours, and the polymerization was further continued for 1 hour to give an aqueous latex of a graft copolymer having an average particle size of 800 Å.

A resin composition was prepared and estimated in the same manner as in Example 1. The results are shown in Table 1.

COMPARATIVE EXAMPLE 2

The procedure of Comparative Example 1 was repeated except that the order of the first stage graft polymerization and the second stage graft polymerization was reversed.

The results are shown in Table 1.

COMPARATIVE EXAMPLE 3

The procedure of Example 1 was repeated except that the order of the first stage graft polymerization and the second stage graft polymerization was reversed and potassium chloride was used in an amount of 1.5 parts.

The results are shown in Table 1.

COMPARATIVE EXAMPLE 4

The rubber latex A was prepared in the same manner as in Example 1.

To 210 parts of the rubber latex A ( solid matter: 70 parts) were added 200 parts of water, 0.002 part of ferrous sulfate, 0.004 part of disodium ethylenediaminetetraacetate, 0.1 part of formaldehyde sodium sulfoxylate and 1.8 parts of potassium chloride.

To the resulting mixture was continuously added a mixture of 15 parts of styrene, 15 parts of methyl methacrylate and 0.3 part of cumene hydroperoxide at 70° C. over 5 hours, and the polymerization was continued for 1 hour to give an aqueous latex of a graft copolymer having an average particle size of 1500 Å.

A resin composition was prepared and estimated in the same manner as in Example 1. The results are shown in Table 1.

COMPARATIVE EXAMPLE 5

The rubber latex A was prepared in the same manner as in Example 1.

A polymerization vessel equipped with a stirrer was charged with 45 parts of the rubber latex A ( solid matter: 15 parts ), 200 parts of water, 0.2 part of sodium oleate, 0.0017 part of ferrous sulfate, 0.00425 part of disodium ethylenediaminetetraacetate, 0.17 part of formaldehyde sodium sulfoxylate, 0.17 part of tripotassium phosphate, 63.75 parts of butadiene, 21.25 parts of styrene, 0.85 part of divinyl benzene and 0.85 part of diisopropylbenzene hydroperoxide. The polymerization was carried out at 50° C. for 24 hours. After 6 hours and 12 hours from the beginning of the polymerization, 0.3 part of sodium oleate was added to the reaction mixture, respectively, and after 18 hours from the beginning, 0.475 part of sodium oleate was added. The obtained rubber latex of which average particle size of polymer particles was 1400 Å (hereinafter referred to as "rubber latex B"). The polymerization conversion was 99%.

To 210 parts of the rubber lates B ( solid matter: 70 parts ) were added 200 parts of water, 0.002 part of ferrous sulfate, 0.004 part of disodium ethylenediaminetetraacetate and 0.1 part of formaldehyde sodium sulfoxylate. To the latex was then continuously added a mixture of 14 parts of methyl methacrylate, 1.0 part of styrene and 0.1 part of cumene hydroperoxide at 70° C. over 3 hours, and the polymerization was further continued for 30 minutes (the first stage graft polymerization). Then, a mixture of 14 parts of styrene, 1.0 part of methyl methacrylate and 0.2 part of cumene hydroperoxide was continuously added at 70° C. over 3 hours. The polymerization was further continued for 1 hour (the second stage graft polymerization) to give an aqueous latex of a graft copolymer having an average particle size of 1500 Å.

A resin composition was prepared and estimated in the same manner as in Example 1. The results are shown in Table 1.

COMPARATIVE EXAMPLE 6

The procedure of Comparative Example 5 was repeated except that the order of the first stage graft polymerization and the second stage graft polymerization was reversed.

The results are shown in Table 1.

COMPARATIVE EXAMPLE 7

The procedure of Comparative Example 3 was repeated except that potassium chloride was used in an amount of 1.1 parts.

The results are shown in Table 1.

TABLE 1

| | Rubber (parts) | Graft component (parts) 1st stage | Graft component (parts) 2nd stage | Agglomeration*1 | Emulsification*2 | Particle size (Å) | Weight ratio*3 of scales (%) |
|---|---|---|---|---|---|---|---|
| Ex. 1 | A*4 (70) | St*5 (14) / M*6 (1) | M (14) / St (1) | Yes | No | 1500 | 2.2 |
| Ex. 2 | A (70) | St (14) / M (1) | M (14) / St (1) | Yes | Yes | 1500 | 0.6 |
| Ex. 3 | A (70) | St (14) / M (1) | M (14) / St (1) | Yes | No | 1800 | 3.0 |
| Ex. 4 | A (70) | St (14) / M (1) | M (14) / St (1) | Yes | No (Only soap was added.) | 1500 | 2.0 |
| Com.Ex.1 | A (70) | M (14) / St (1) | St (14) / M (1) | No | No | 800 | 0.2 |
| Com.Ex.2 | A (70) | St (14) / M (1) | M (14) / St (1) | No | No | 800 | 0.2 |
| Com.Ex.3 | A (70) | M (14) / St (1) | St (14) / M (1) | Yes | No | 1500 | 0.6 |
| Com.Ex.4 | A (70) | M (15) / St (15) | — / — | Yes | No | 1500 | 0.6 |
| Com.Ex.5 | B*7 (70) | M (14) / St (1) | St (14) / M (1) | No | No | 1500 | 0.2 |
| Com.Ex.6 | B (70) | St (14) / M (1) | M (14) / St (1) | No | No | 1500 | 0.2 |
| Com.Ex.7 | A (70) | St (14) / St (1) | M (14) / M (1) | Yes | No | 1000 | 0.4 |

| | Properties of molded PVC composition | |
|---|---|---|
| | Light transmission (%) | Izod impact strength (at 0° C.) |
| Ex. 1 | 75 | 21 |

TABLE 1-continued

| | | |
|---|---|---|
| Ex. 2 | 76 | 21 |
| Ex. 3 | 69 | 30 |
| Ex. 4 | 75 | 21 |
| Com.Ex.1 | 80 | 5 |
| Com.Ex.2 | 79 | 6 |
| Com.Ex.3 | 68 | 15 |
| Com.Ex.4 | 60 | 15 |
| Com.Ex.5 | 69 | 9 |
| Com.Ex.6 | 68 | 9 |
| Com.Ex.7 | 75 | 10 |

(Notes)
*[1] Whether the agglomeration of the graft copolymer was caused or not was observed. Yes: The agglomeration was caused. No: The agglomeration was not caused.
*[2] Whether the monomer mixture used in the 2nd stage was emulsified or not. Yes: The monomer mixture was emulsified. No: The monomer mixture was not emulsified.
*[3] The weight ratio of scales generated during graft polymerization to the graft copolymer
*[4] A Rubber latex A
*[5] St Styrene
*[6] M Methyl methacrylate
*[7] B Rubber latex B

EXAMPLE 5

The rubber latex A was prepared in the same manner as in Example 1.

To 210 parts of the rubber latex A (solid matter: 70 parts) were added 200 parts of water, 0.002 part of ferrous sulfate, 0.004 part of disodium ethylenediaminetetraacetate, 0.1 part of formaldehyde sodium sulfoxylate and 2.4 parts of potassium chloride. To the latex was then continuously added a mixture (b') of 4 parts of styrene and 0.1 part of cumene hydroperoxide at 70° C. over 1 hour, and the polymerization was further continued for 30 minutes (the first stage graft polymerization). Then, a mixture (c') of 15 parts of methyl methacrylate, 1.0 part of styrene and 0.1 part of cumene hydroperoxide was continuously added to 70° C. over 3 hours to the polymerization mixture the first stage graft polymerization, and the polymerization was further continued for 30 minutes (the second stage graft polymerization). Then, a mixture (d') of 10 parts of styrene and 0.2 part of cumene hydroperoxide was continuously added at 70° C. over 2 hours to the polymerization mixture the second stage graft polymerization, and the polymerization was further continued for 1 hour (the third stage graft polymerization) to give an aqueous latex of a graft copolymer.

The particles of the graft copolymer latex were agglomerated, and had an average particle size of 1800 Å. A weight ratio of scales generated during graft polymerization to the graft copolymer was 4.5%.

A resin composition was prepared and estimated in the same manner as in Example 1. The results are shown in Table 2.

EXAMPLE 6

The procedure of Example 5 was repeated except that the monomer mixture (c') used in the second stage graft polymerization, that is, 15 parts of methyl methacrylate, 1.0 part of styrene and 0.1 part of cumene hydroperoxide were emulsified in an aqueous solution of 0.3 part of sodium oleate and 15 parts of water by using a homogenizer, then the obtained emulsion was continuously added to the reaction mixture in the first stage graft polymerization over 3 hours.

The results are shown in Table 2.

EXAMPLE 7

The procedure of Example 5 was repeated except that the amount of the used potassium chloride was changed to 1.8 parts, so the obtained graft copolymer had an average particle size of 1300 Å.

The results are shown in Table 2.

EXAMPLE 8

The procedure of Example 5 was repeated except that before adding the monomer mixture (c'), 15.3 parts of an aqueous solution containing 0.3 part of sodium oleate was added to the reaction mixture in the first stage polymerization.

The results are shown in Table 2.

COMPARATIVE EXAMPLE 8

The rubber latex A was prepared in the same manner as in Example 1.

To 210 parts of the rubber latex A (solid matter: 70 parts) were added 200 parts of water, 0.002 part of ferrous sulfate, 0.004 part of disodium ethylenediaminetetraacetate and 0.1 part of formaldehyde sodium sulfoxylate.

To the resulting mixture was continuously added a mixture of 15 parts of methyl methacrylate, 1.0 part of styrene and 0.3 part of cumene hydroperoxide at 70° C. over 3 hours, and the polymerization was continued for 30 minutes.

Then, a mixture of 14 parts of styrene and 0.2 part of cumene hydroperoxide was continuously added over 3 hours, and the polymerization was further continued for 1 hour to give an aqueous latex of a graft copolymer having an average particle size of 800 Å.

A resin composition was prepared and estimated in the same manner as in Example 1. The results are shown in Table 2.

COMPARATIVE EXAMPLE 9

The procedure of Comparative Example 8 was repeated except that the order of the first stage graft polymerization and the second stage graft polymerization was reversed.

The results are shown in Table 2.

COMPARATIVE EXAMPLE 10

The procedure of Comparative Example 8 was repeated except that potassium chloride was used in an amount of 1.8 parts.

The results are shown in Table 2.

COMPARATIVE EXAMPLE 11

The rubber latex A was prepared in the same manner as in Example 1.

To 210 parts of the rubber latex A ( solid matter: 70 parts) were added 200 parts of water, 0.002 part of ferrous sulfate, 0.004 part of disodium ethylenediaminetetraacetate, 0.1 part of formaldehyde sodium sulfoxylate and 2.3 parts of potassium chloride.

To the resulting mixture was continuously added a mixture of 15 parts of styrene, 15 parts of methyl methacrylate and 0.3 part of cumene hydroperoxide at 70° C. over 5 hours, and the polymerization was continued for 1 hour to give an aqueous latex of a graft copolymer having an average particle size of 1800 Å.

A resin composition was prepared and estimated in the same manner as in Example 1. The results are shown in Table 2.

COMPARATIVE EXAMPLE 12

The rubber latex A was prepared in the same manner as in Example 1.

A polymerization vessel equipped with a stirrer was charged with 27 parts of the rubber latex A ( solid matter: 9 parts ), 200 parts of water, 0.2 part of sodium oleate, 0.0018 part of ferrous sulfate, 0.0045 part of disodium ethylenediaminetetraacetate, 0.18 part of formaldehyde sodium sulfoxylate, 0.18 part of tripotassium phosphate, 68.25 parts of butadiene, 22.75 parts of styrene, 0.91 part of divinyl benzene and 0.91 part of diisopropylbenzene hydroperoxide. The polymerization was carried out at 50° C. for 40 hours. After 6 hours, 12 hours and 18 hours from the beginning of the polymerization, 0.2635 part of sodium oleate was added to the reaction mixture, respectively. The obtained rubber latex of which average particle size of polymer particles was 1650 Å (hereinafter referred to as "rubber latex C"). The polymerization conversion was 99%.

To 210 parts of the rubber latex C ( solid matter: 70 parts ) were added 200 parts of water, 0.002 part of ferrous sulfate, 0.004 part of disodium ethylenediaminetetraacetate and 0.1 part of formaldehyde sodium sulfoxylate. To the latex was then continuously added a mixture of 15 parts of methyl methacrylate, 1.0 part of styrene and 0.1 part of cumene hydroperoxide at 70° C. over 3 hours, and the polymerization was further continued for 30 minutes (the first stage graft polymerization). Then, a mixture of 14 parts of styrene and 0.2 part of cumene hydroperoxide was continuously added at 70° C. over 3 hours. The polymerization was further continued for 1 hour (the second stage graft polymerization) to give an aqueous latex of a graft copolymer having an average particle size of 1800 Å.

A resin composition was prepared and estimated in the same manner as in Example 1. The results are shown in Table 2.

COMPARATIVE EXAMPLE 13

The procedure of Comparative Example 12 was repeated except that the order of the first stage graft polymerization and the second stage graft polymerization was reversed.

The results are shown in Table 2.

COMPARATIVE EXAMPLE 14

The rubber latex C was prepared in the same manner as in Comparative Example 12.

To 210 parts of the rubber latex B (solid matter: 70 parts ) were added 200 parts of water, 0.002 part of ferrous sulfate, 0.004 part of disodium ethylenediaminetetraacetate and 0.1 part of formaldehyde sodium sulfoxylate.

To the resulting mixture was continuously added a mixture of 4 parts of styrene and 0.1 part of cumene hydroperoxide at 70° C. over 1 hour, and the polymerization was continued over 30 minutes ( the first stage graft polymerization).

Then, a mixture of 15 parts of methyl methacrylate, 1.0 part of styrene and 0.1 part of cumene hydroperoxide was continuously added over 3 hours, and the polymerization was continued for 30 minutes ( the second stage graft polymerization).

Then, a mixture of 10 parts of styrene and 0.2 parts of cumene hydroperoxide was continuously added at 70° C. over 2 hour, and the polymerization was continued for 1 hour (the third stage graft polymerization) to give an aqueous latex of a graft copolymer having an average particle size of 1800 Å.

A resin composition was prepared and estimated in the same manner as in Example 1. The results are shown in Table 2.

COMPARATIVE EXAMPLE 15

The procedure of Comparative Example 10 was repeated except that the amount of potassium chloride was changed to 1.3 parts.

The results are shown in Table 2.

TABLE 2

| | Rubber (parts) | Graft component (parts) | | | Agglomeration | Emulsification | Particle size (Å) | Weight ratio of scales (%) |
|---|---|---|---|---|---|---|---|---|
| | | 1st stage | 2nd stage | 3rd stage | | | | |
| Ex. 5 | A (70) | St (4) | M (15) | St (10) | Yes | No | 1800 | 4.5 |
| | | | St (1) | | | | | |
| Ex. 6 | A (70) | St (4) | M (15) | St (10) | Yes | Yes | 1800 | 0.7 |
| | | | St (1) | | | | | |
| Ex. 7 | A (70) | St (4) | M (15) | St (10) | Yes | No | 1300 | 3.0 |
| | | | St (1) | | | | | |
| Ex. 8 | A (70) | St (4) | M (15) | St (10) | Yes | No*1 | 1800 | 4.2 |
| | | | St (1) | | | | | |
| Com.Ex.8 | A (70) | M (15) | St (14) | — | No | No | 800 | 0.2 |
| | | St (1) | | | | | | |
| Com.Ex.9 | A (70) | St (14) | M (15) | — | No | No | 800 | 0.2 |
| | | | St (1) | | | | | |

TABLE 2-continued

| | | | | | | | | |
|---|---|---|---|---|---|---|---|---|
| Com.Ex.10 | A (70) | { M (15) / St (1) | St (14) | — | Yes | No | 1800 | 1.2 |
| Com.Ex.11 | A (70) | { M (15) / St (15) | — | — | Yes | No | 1800 | 0.7 |
| Com.Ex.12 | C*2(70) | { M (15) / St (1) | St (14) | — | No | No | 1800 | 0.2 |
| Com.Ex.13 | C (70) | St (14) | { M (15) / St (1) | — | No | No | 1800 | 0.2 |
| Com.Ex.14 | C (70) | St (4) | { M (15) / St (1) | St (10) | No | No | 1800 | 0.3 |
| Com.Ex.15 | A (70) | { M (15) / St (1) | St (14) | — | Yes | No | 1300 | 0.6 |

| | Properties of molded PVC composition | |
|---|---|---|
| | Light transmission (%) | Izod impact strength (at 0° C.) |
| Ex. 5 | 67 | 45 |
| Ex. 6 | 67 | 45 |
| Ex. 7 | 76 | 35 |
| Ex. 8 | 67 | 45 |
| Com.Ex.8 | 80 | 5 |
| Com.Ex.9 | 79 | 6 |
| Com.Ex.10 | 67 | 25 |
| Com.Ex.11 | 57 | 18 |
| Com.Ex.12 | 67 | 13 |
| Com.Ex.13 | 65 | 20 |
| Com.Ex.14 | 67 | 25 |
| Com.Ex.15 | 70 | 13 |

(Notes)
*1 There was added 15.3 parts of aqueous solution containing 0.3 part of sodium oleate.
*2 C Rubber latex C The composition of the present invention is the vinyl chloride resin composition which is superior in impact resistance to the conventional compositions as well as which keep excellent in transparency.

In addition to the ingredients used in the Examples, other ingredients can be used in Examples as set forth in the specification to obtain substantially the same results.

What we claim is:

1. A vinyl chloride resin composition which comprises:

(A) 1 to 30% by weight of a graft copolymer and
(B) 99 to 70% by weight of a vinyl chloride resin; said graft copolymer (A) being prepared by
  (i) adding a water-soluble electrolyte to an aqueous latex containing 50 to 85 parts by weight of a butadiene polymer (a) of 60 to 100% by weight of butadiene, 40 to 0% by weight of an aromatic vinyl monomer, 10 to 0% by weight of a vinyl monomer copolymerizable therewith and 5 to 0% by weight of a crosslinkable monomer, said butadiene polymer (a) having an average particle size of less than 0.1 μm,
  (ii) adding 1 to 45 parts by weight of a monomer mixture (b) to said latex and carrying out the polymerization, said monomer mixture (b) comprising 51 to 100% by weight of an aromatic vinyl monomer, 49 to 0% by weight of an alkyl methacrylate and 0 to 20% by weight of a vinyl monomer copolymerizable therewith,
  (iii) adding 5 to 45 parts by weight of a monomer mixture (c) to the polymerization mixture in the step (ii) and carrying out the polymerization, said monomer mixture (c) comprising 51 to 100% by weight of an alkyl methacrylate, 49 to 0% by weight of an aromatic vinyl monomer and 0 to 20% by weight of a vinyl monomer copolymerizable therewith, and
  (iv) adding 0 to 30 parts by weight of a monomer mixture (d) to the polymerization mixture in the step (iii) and carrying out the polymerization, said monomer mixture (d) comprising 51 to 100% by weight of an aromatic vinyl monomer, 49 to 0% by weight of an alkyl methacrylate and 0 to 20% by weight of a vinyl monomer copolymerizable therewith;
  the total amount of the polymer (a), the mixture (b), the mixture (c) and the mixture (d) being 100 parts by weight.

2. The composition of claim 1, wherein the mount of said butadiene polymer (a) is from 50 to 85 parts by weight, the mount of said monomer mixture (b) is from 1 to 20 parts by weight, the mount of said monomer mixture (c) is from 5 to 45 parts by weight and the mount of said monomer mixture (d) is from 4 to 30 parts by weight, the total amount of (a), (b), (c) and (d) being 100 parts by weight.

3. The composition of claim 1, wherein the amount of said butadiene polymer (a) is from 50 to 85 parts by weight, the mount of said monomer mixture (b) is from 5 to 45 parts by weight, the mount of said monomer mixture (c) is from 5 to 45 parts by weight and the mount of said monomer mixture (d) is 0 part by weight, the total mount of (a), (b) and (c) being 100 parts by weight.

4. The composition of claim 1, wherein said monomer mixture (c) is added to 5 to 90 parts by weight of an aqueous solution containing 0.05 to 3 parts by weight of an emulsifier and the mixture is stirred to emulsify said monomer mixture (c), and the emulsion is continuously added to the polymerization mixture in the step (ii).

* * * * *